Patented Mar. 16, 1948

2,437,937

UNITED STATES PATENT OFFICE 2,437,937

PROCESS FOR TREATING TOMATOES

David Childs, Albert E. Braun, and James Hanson, Sunnyvale, Calif., assignors to Libby, McNeill & Libby, Chicago, Ill., a corporation of Maine No Drawing. Application March 29, 1946, Serial No. 658,229

4 Claims. (Cl. 99—186)

This invention relates to a new and improved process for treating tomatoes for packing or canning.

This invention relates particularly to a new and improved procedure for removing the skins of tomatoes while leaving the underskins intact and while maintaining conditions which harden or set the underskin so that the tomatoes are firm and, after canning, retain their shape without being unduly softened or broken down as a result of the cooking treatment.

The nature of this invention will be more fully appreciated and understood from a detailed description of one particular method of carrying it into practice.

The tomatoes selected for packing or canning are first assorted and the firm, unspoiled specimens are selected, washed, and then immersed in a water solution of calcium chloride which has been heated to a temperature of approximately 270° F. to approximately 310° F. The immersion treatment is preferably continued for a period of from fifteen to sixty seconds, and the time varying somewhat according to the maturity and variety of the tomatoes undergoing treatment.

Following the immersion treatment, the tomatoes are washed in water, whereupon it occurs that the skin or exocarp is easily removed while at the same time the flesh or mesocarp remains intact and the tomato as a whole remains firm.

During the immersion treatment, the skin of the tomato is released at all points except at the stem end of the fruit. Thereafter, the tomatoes are washed to complete the removal of the skin and to remove the adhering calcium chloride. Thereafter, the tomatoes are cored, and the cores and skins are removed from the prepared firm tomatoes. The tomatoes so produced and thereafter packed in the usual manner according to known and established technique suitable for the purpose.

As a result of this process, it has been found that the underskin or mesocarp of the tomato is not removed, and consequently the finished product has a better appearance and color, which is due at least partially to the fact that the veins of the tomato are not exposed. The process has the further advantage that the skins are rendered more easily removable by the immersion in a calcium chloride solution, as described, than by treatments heretofore known and employed.

A further advantage results from the fact that higher drained weights of products are obtained, and better retention of the original shape is realized. As a result, a higher order of canned product is produced, and particularly one which is productive of tomatoes which are firm and whole and which can be sliced and used for salads and the like, in a manner similar to whole fresh tomatoes.

In carrying out the process, the immersion bath is preferably brought to approximately the boiling point, and the elevated temperature is produced as a result of the presence of the calcium chloride rather than by the utilization of pressure. In fact, it is preferable to use open immersion vessels, that is to say, ones which do not produce pressure in excess of atmospheric pressure. With such vessels the immersion bath will reach a temperature characteristic of the solution utilized, as created by the selected amount of calcium chloride. For instance, if sufficient calcium chloride is utilized to produce a saturated solution, the solution will have a boiling point of approximately 356° F. Obviously, this is the highest temperature that can be obtained unless pressures are resorted to, which, as above stated, are not recommended for practicing this invention. Whereas saturated solutions can be used involving the development of temperatures around 356° F., it is not desirable nor in many cases practical to utilize saturated solutions. Preferably, a solution of calcium chloride of approximately 60% gives the best results and is productive of a temperature of approximately 280° F. at the boiling point of the solution.

The exact quantities of calcium chloride utilized need not be specified as the concentration of the solution controls the boiling point. All calcium chloride solutions producing boiling points of from approximately 270° F. up to approximately 310° F. are regarded as coming within the scope of this invention.

It is to be understood that any type of heating means may be employed to heat the immersion bath.

The applicants are aware of the fact that various substances have heretofore been used for removing the skins of fruit and tomatoes, such as, for instance, lye, sodium carbonate, mixtures of sodium chloride and sodium carbonate, sodium hydroxide, and other caustic materials, but in all such cases the action of the substance employed results in a substantial softening of the tomatoes, which destroys their firmness, the continued presence of which firmness characterizes the products resulting from the present invention. Also, methods have been used which employ relatively high temperatures, such as steam under high pressure, but here again the firmness of the fruit is impaired.

The characteristic of the present invention which is believed to be novel and which is critical to the results produced, is that of using the calcium chloride at a temperature of between approximately 270° F. and approximately 310° F. This type of solution exhibits to a marked degree the characteristic of imparting firmness to the fruit. In consequence, the process enables the production of a product which will resist the tendency to soften while cooking in the container and one which can be presented to the consumer in condition to be sliced and used for salads and the like in the manner characteristic of the use of fresh whole tomatoes.

What is claimed is:

1. The method of treating tomatoes, which comprises immersing whole fresh tomatoes in a water solution of calcium chloride of a concentration productive of a boiling point at atmospheric pressure between approximately 270° F. and approximately 310° F., and while maintaining the temperature of said solution at from approximately 270° F. to approximately 310° F., continuing the immersion of said tomatoes for a period of approximately fifteen seconds to approximately sixty seconds, and thereafter removing the exocarp from the tomatoes so treated.

2. The process of treating tomatoes, which comprises immersing them in approximately a 60% solution of calcium chloride maintained at a temperature of approximately 280° F., and continuing the immersion treatment for a period of approximately fifteen seconds to sixty seconds depending on the maturity and variety of the tomatoes, and finally removing the exocarp freed by such immersion treatment.

3. The method of treating tomatoes, which comprises immersing the whole fresh tomatoes in a bath comprising a calcium chloride water solution having a boiling point at atmospheric pressure of from approximately 270° F. to approximately 310° F., maintaining the tomatoes so immersed for a period of approximately fifteen seconds to sixty seconds, thereafter removing the exocarp from the tomatoes, and finally sealing said tomatoes in containers and cooking the same.

4. The process of treating tomatoes, which comprises immersing them in approximately a 60% solution of calcium chloride maintained at a temperature of approximately 280° F., continuing the immersion treatment for a period of approximately fifteen seconds to sixty seconds depending on the maturity and variety of the tomatoes, thereafter removing the exocarp freed by such immersion treatment, and finally sealing said tomatoes in containers and cooking the same.

DAVID CHILDS.
ALBERT E. BRAUN.
JAMES HANSON.

REFERENCES CITED

The following references are of record in the file of this patent:

UNITED STATES PATENTS

| Number | Name | Date |
|---|---|---|
| 850,655 | Judge | Apr. 16, 1907 |
| 1,910,749 | Chapman | May 23, 1933 |
| 2,191,835 | Snelling | Feb. 27, 1940 |
| 2,333,873 | Martin | Nov. 9, 1943 |